United States Patent
Shibahata

(10) Patent No.: US 8,640,816 B2
(45) Date of Patent: Feb. 4, 2014

(54) VEHICULAR STEERING APPARATUS

(75) Inventor: Yasuji Shibahata, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 507 days.

(21) Appl. No.: 12/957,589

(22) Filed: Dec. 1, 2010

(65) Prior Publication Data

US 2011/0127104 A1   Jun. 2, 2011

(30) Foreign Application Priority Data

Dec. 2, 2009   (JP) ................................. 2009-274545

(51) Int. Cl.
*B62D 5/04* (2006.01)
*B62D 5/00* (2006.01)

(52) U.S. Cl.
USPC .......................................... 180/444; 180/402

(58) Field of Classification Search
USPC .......................................... 180/443, 402, 444
See application file for complete search history.

(56) References Cited

U.S. PATENT DOCUMENTS

| 5,836,419 | A | * | 11/1998 | Shimizu et al. | ............... | 180/443 |
| 2009/0055050 | A1 | * | 2/2009 | Onuma et al. | .................. | 701/43 |

FOREIGN PATENT DOCUMENTS

| JP | 2001-080531 A | 3/2001 |
| JP | 2005-178460 A | 7/2005 |
| JP | 2005-178461 A | 7/2005 |
| JP | 2005-335433 A | 12/2005 |
| JP | 2006-182057 A | 7/2006 |
| JP | 2007-160964 A | 6/2007 |
| JP | 2007-185985 A | 7/2007 |
| JP | 2008-189077 A | 8/2008 |
| JP | 2008-195187 A | 8/2008 |
| JP | 2009-113667 A | 5/2009 |

* cited by examiner

*Primary Examiner* — Paul N Dickson
*Assistant Examiner* — Daniel Yeagley
(74) *Attorney, Agent, or Firm* — Carrier Blackman & Associates, P.C.; William D. Blackman; Fulchand P. Shende

(57) ABSTRACT

A vehicular steering apparatus includes: a road-wheel turning mechanism mechanically separated from, but electrically connected to a steering wheel; a first rotation shaft connected to the steering wheel; a second rotation shaft connected to the road-wheel turning mechanism; and a connection mechanism for interconnecting the first and second rotation shafts in such a manner that the first and second rotation shafts can rotate idle relative to each other within a range of a predetermined relative rotational angle.

5 Claims, 11 Drawing Sheets

CLUTCH - OFF

CLUTCH - ON

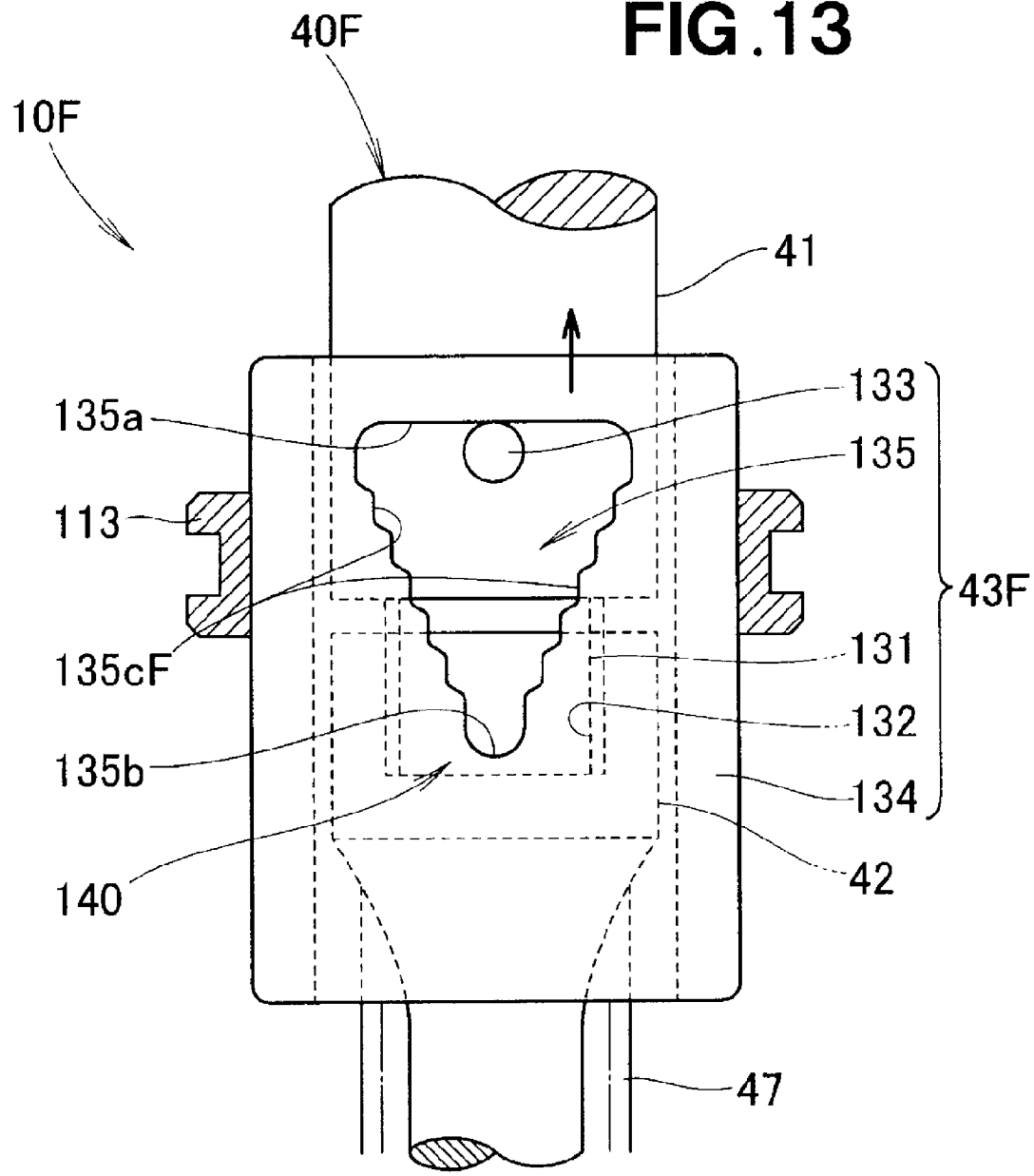

VEHICULAR STEERING APPARATUS

FIELD OF THE INVENTION

The present invention relates to a steer-by-wire vehicular steering apparatus.

BACKGROUND OF THE INVENTION

In many of the conventionally-known vehicular steering apparatus, a road-wheel turning mechanism is connected to a steering wheel, and tire or road wheels are steered by steering force of the steering wheel via the road-wheel turning mechanism. In recent years, so-called steer-by-wire ("SBW") type vehicular steering apparatus have been under development, in which the road-wheel turning mechanism is mechanically separated from the steering wheel, and in which a road-wheel turning actuator generates road-wheel turning power in response to a steering operation amount and the road wheels are steered by the thus-generated road-wheel turning power being transmitted to the road-wheel turning mechanism. Examples of such steer-by-wire type vehicular steering apparatus are disclosed in Japanese Patent Application Laid-Open Publication No. 2008-189077 (hereinafter referred to as "patent literature 1") and Japanese Patent Application Laid-Open Publication No. 2008-195187 (hereinafter referred to as "patent literature 2").

In the vehicular steering apparatus disclosed in patent literature 1 and patent literature 2, the road-wheel turning mechanism is connected to the steering wheel via two connection paths, i.e. electric and mechanical connection paths. The mechanical connection path is used as a backup for the electric connection path. Normally, the steering wheel and the road-wheel turning mechanism are interconnected only via the electric connection path. Once the electric connection path is canceled or deactivated for some reason, the connection between the steering wheel and the road-wheel turning mechanism is automatically switched to the mechanical connection path.

In the normal operating state, where the steering wheel and the road-wheel turning mechanism are interconnected only via the electric connection path, the road wheels can be steered under optimal conditions on the basis of composite information comprising a combination of steering information (such as a steering angle and speed) input by a human driver and external information, such as a vehicle velocity, added to the steering information. Thus, in the normal operating state, a high maneuverability of the vehicle can be achieved. In the normal operating state, the steering wheel and the road-wheel turning mechanism are mechanically separated from each other as noted above, so that there is no restriction or limit to the steering angle of the steering wheel. Thus, some limit has to be put on the steering angle of the steering wheel for the following reason.

Today, many of the steering wheels are equipped with an airbag device rotatable with the steering wheel, and such an airbag device and a control section fixed to the vehicle body for issuing control signals to the airbag device are interconnected via a cable that is wound on a cable reel attached to the steering wheel. The number of times the cable reel can rotate is limited by the number of turns of the cable on the reel. Thus, if there is no limit on the steering angle (number of rotations) of the steering wheel, an excessive load would be imposed on the cable reel and cable.

Because the steering angle of the steering wheel ordinarily exceeds 360°, it is not possible to put a limit on the steering angle by means of a mere stopper alone. Therefore, a mechanism for putting a limit on the steering angle of the steering wheel tends to be extremely complicated in construction. One conceivable approach for putting a limit on the steering angle of the steering wheel is to use a steering reaction motor provided, for example, in the above-mentioned electric connection path. The steering reaction motor generates steering reaction force against steering force with which the steering wheel is operated by the driver, i.e. generates steering operation resistance to be applied to the steering wheel in a rotating direction of the steering wheel. Namely, the above-mentioned conceivable approach is intended to cause the steering reaction motor to generate an extremely great steering reaction force when the steering angle of the steering wheel has reached a predetermined rotational angle.

However, the above-mentioned conceivable approach requires a high-power steering reaction motor that tends to unavoidably become large in size and weight, which would lead to an increased size and cost of the steering apparatus. For this reason, the above-mentioned conceivable approach is not so a good approach.

SUMMARY OF THE INVENTION

In view of the foregoing prior art problems, it is an object of the present invention to provide a technique which can readily and reliably limit the steering angle of the steering wheel in a steer-by-wire type vehicular steering apparatus.

In order to accomplish the above-mentioned object, the present invention provides an improved vehicular steering apparatus, which comprises: a road-wheel turning mechanism mechanically separated from but electrically connected to a steering wheel via an electric connection path which includes a road-wheel turning actuator for generating road-wheel turning power in accordance with steering information based on steering operation of the steering wheel and which transmits the generated road-wheel turning power to the road-wheel turning mechanism so that road wheels of a vehicle are steered via the road-wheel turning mechanism; a first rotation shaft connected to the steering wheel; a second rotation shaft connected to the road-wheel turning mechanism; and a connection mechanism for interconnecting the first and second rotation shafts in such a manner that the first and second rotation shafts can idle relative to each other within a range of a predetermined relative rotational angle.

In the present invention, the first rotation shaft connected to the steering wheel and the second rotation shaft connected to the road-wheel turning mechanism are interconnected in such a manner that the first and second rotation shafts can rotate idle relative to each other within the range of the predetermined relative rotational angle.

Let's now assume a case where the steering wheel and the road-wheel turning mechanism are interconnected only via the electric connection path. As the steering wheel is steered, the first rotation shaft rotates leftward or rightward in accordance with the steering angle of the steering wheel. Then, the road-wheel turning actuator generates road-wheel turning power in accordance with steering operation information based on the steering operation of the steering wheel, and the thus-generated road-wheel turning power is transmitted to the road-wheel turning mechanism so that the road wheels are turned via the road-wheel turning mechanism.

Generally, the maximum road-wheel turning angle, at which the road wheels can be turned via the road-wheel turning mechanism, is set in advance. For example, in a case where the steering apparatus is an end take-off steering apparatus where road-wheel turning power is taken out from the opposite ends of a road-wheel turning shaft slidable in a width direction of the vehicle, the maximum road-wheel turning angle is restricted or limited by the stroke of the road-wheel turning shaft being restricted by a stopper. Because the second rotation shaft rotates horizontally leftward or rightward in response to operation of the road-wheel turning mechanism, the maximum rotational angle of the second rotation shaft is limited to a range where the road wheels can be turned via the road-wheel turning mechanism through the maximum road-wheel turning angle.

Further, the first rotation shaft can freely rotate idle, without influencing the rotation of the second rotation shaft, only within the range of the predetermined relative rotational angle to the second rotation shaft. The predetermined relative rotational angle of the first rotation shaft to the second rotation shaft may be set as appropriate within the range of the maximum rotational angle of the second rotation shaft. The maximum rotational angle of the first rotation shaft falls within an angular range equal to a sum of the maximum rotational angle of the second rotation shaft and predetermined relative rotational angle. Namely, the maximum rotational angle (maximum steering angle) of each of the first rotation shaft and steering wheel is limited.

Similarly, in a case where the steering wheel and the road-wheel turning mechanism are interconnected only via the mechanical connection mechanism (i.e., mechanical connection path), the maximum rotational angle of each of the first rotation shaft and steering wheel is limited.

Namely, in the present invention, the maximum rotational angle of each of the first rotation shaft and steering wheel is limited irrespective of whether the steering wheel and the road-wheel turning mechanism are interconnected via the electric connection path or via the mechanical connection mechanism. Thus, an excessive load will not be imposed on a cable reel attached to the steering wheel and a cable wound on the cable reel. In this way, in the steer-by-wire type vehicular steering apparatus, the steering angle of the steering wheel can be limited readily and reliably.

Preferably, the steering information is indicative of at least one of a steering angle, steering angle velocity, steering angle acceleration, steering torque and differentiated value (i.e., change rate) of the steering torque of the steering wheel. In this way, an optimal steer-by-wire type steering apparatus corresponding to any of various models can be provided by appropriately selecting optimal steering information corresponding to the model at development and design stages of the vehicle.

Preferably, the vehicular steering apparatus of the present invention further comprises a reaction motor for generating steering reaction force corresponding to the steering information, and a reaction force transmission mechanism for transmitting the steering reaction force to the steering wheel. For example, when the rotational angle of the first rotation shaft has come to almost fall outside the range of the predetermined relative rotational angle to the second rotation shaft, the reaction motor is controlled to rapidly increase the steering reaction force to be generated thereby. A human driver only has to suppress the steering angle of the steering wheel (refrain from further steering operation) when he or she has recognized the rapid steering reaction force increase.

Preferably, the vehicular steering apparatus of the present invention further comprises a clutch that is normally maintained in an OFF state and that, once the clutch is revered to an ON state, compulsorily switches the first and second rotation shafts to an interconnected state irrespective of a connecting state of the connection mechanism. Thus, the first and second rotation shafts are interconnected irrespective of the connecting state of the connection mechanism Preferably, once the electric connection path is deactivated, the clutch is reversed from the OFF state to the ON state. Thus, once the electric connection path is canceled or deactivated for some reason, the connection between the steering wheel and the road-wheel turning mechanism is automatically switched via the clutch to the mechanical connection mechanism reliably and promptly.

Preferably, the clutch comprises a generally cone-shaped dog clutch or a generally cone-shaped friction clutch. Thus, the clutch can be constructed in a relatively simple manner.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which:

FIG. 13 is a block diagram showing a general construction of a seventh embodiment of the vehicular steering apparatus of the vehicular steering apparatus of the present invention.

DETAILED DESCRIPTION OF THE PREFERRED EMBODIMENTS

Figure 1:
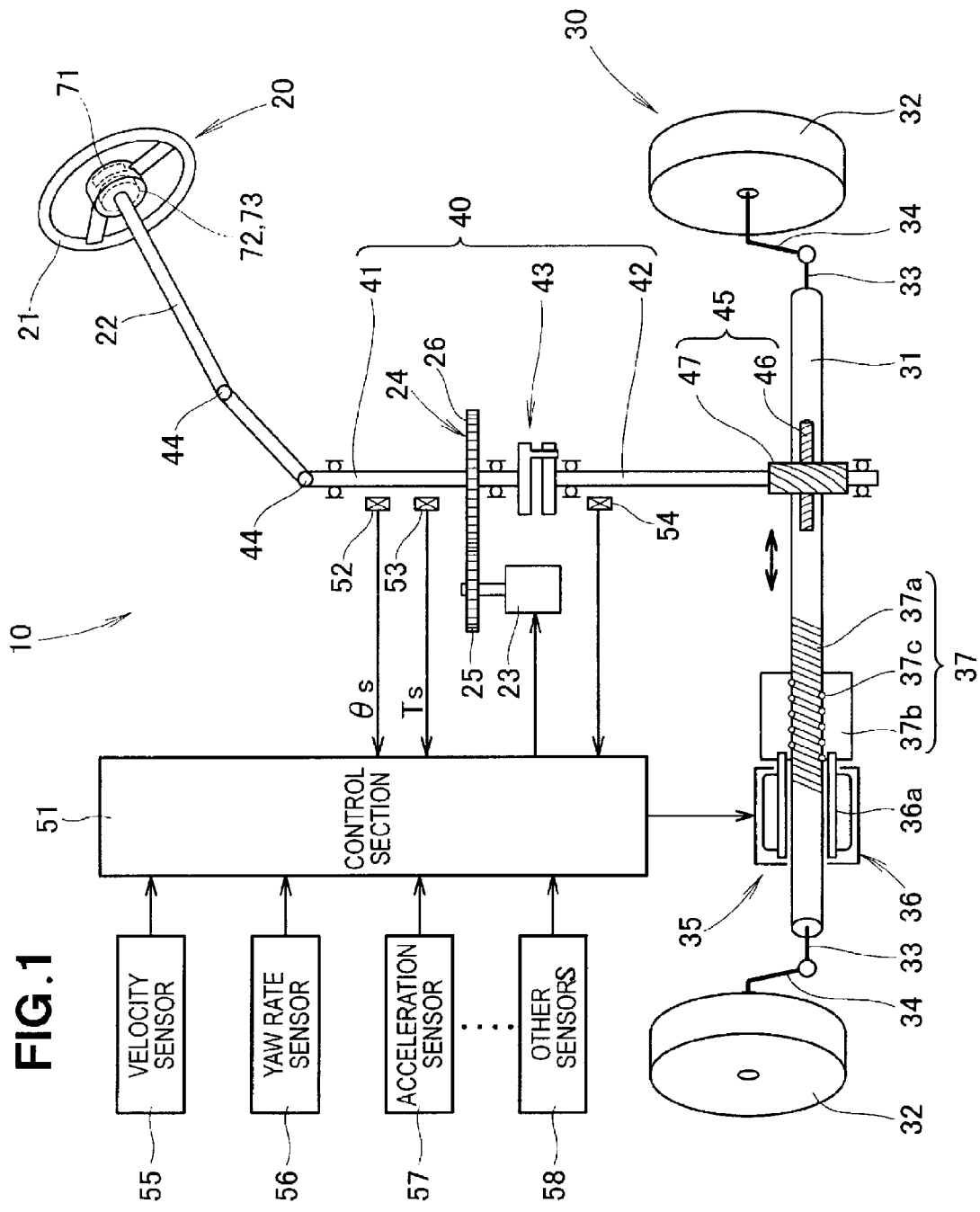
FIG. 1 is a diagram showing a general construction of a first embodiment of a vehicular steering apparatus of the present invention.

First, with reference to FIGS. 1 and 2A-2B, a description will be given about a first embodiment of a vehicular steering apparatus of the present invention. FIG. 1 is a diagram showing an example general construction of the first embodiment of the vehicular steering apparatus 10, which is an end take-off steering apparatus constructed to take out road-wheel turning power from the opposite ends of a road-wheel turning shaft 31 slidable in a width direction of the vehicle. The vehicular steering apparatus 10 is also a so-called steer-by-wire (or "SBW") type vehicular steering apparatus, in which a road-wheel turning mechanism 30 is mechanically separated from, but electrically connected to, a steering wheel 21.

For electrically connecting the road-wheel turning mechanism 30 to the steering wheel 21, a road-wheel turning actuator 35 generates road-wheel turning power in accordance with steering information based on steering operation, by a human driver, of the steering wheel 21, and the thus-generated road-wheel turning power is transmitted to the road-wheel turning mechanism 30 so that left and right road wheels 32 are turned or steered via the road-wheel turning mechanism 30.

The steering apparatus 10 generally comprises a steering mechanism 20, the road-wheel turning mechanism 30, and a control section 51. The steering mechanism 20 includes: the steering wheel 21 manually operable by the human driver of the vehicle; a steering shaft 22 connected to the steering wheel 21; a reaction motor 23 for generating steering reaction force responsive to steering information based on driver's steering operation of the steering wheel 21; and a reaction force transmission mechanism 24 for transmitting the steering reaction force to the steering wheel 21.

The reaction motor 23 is in the form of an electric motor, and the reaction force transmission mechanism 24 includes a pinion 25 mounted on the motor shaft of the reaction motor 23, and a gear 26 held in meshing engagement with the pinion 25. The steering reaction force is steering operation resistance to be applied to the steering wheel in a rotational direction of the steering wheel.

The road-wheel turning mechanism 30 includes a road-wheel turning shaft 31, tie rods 33 connecting left and right road wheels (e.g., front road wheels) 32 to the opposite ends of the road-wheel turning shaft 31, and the road-wheel turning actuator 35 for supplying road-wheel turning power.

The road-wheel turning actuator 35 includes a road-wheel turning power motor 36 for generating road-wheel turning power, and a road-wheel turning power transmission mechanism 37 for transmitting the road-wheel turning power to the road-wheel turning shaft 31. Namely, the road-wheel turning power generated by the road-wheel turning power motor 36 is transmitted to the road-wheel turning shaft 31 via the road-wheel turning power transmission mechanism 37, so that the road-wheel turning shaft 31 slides horizontally in the vehicle width direction. The road-wheel turning power motor 36 is in the form of an electric motor whose motor shaft 36 is a hollow shaft surrounding the road-wheel turning shaft 31. The road-wheel turning power transmission mechanism 37 is in the form of a ball screw that includes a screw section 37a, a nut 37b screwed on the screw section 37a, and a multiplicity of balls 37c. Note that the road-wheel turning power transmission mechanism 37 is not necessarily limited to such a ball screw and may be a worm gear mechanism or a rack-and-pinion mechanism.

As noted above, the wheel steering mechanism 30 is electrically connected to the steering wheel 21. The steering apparatus 10 also includes a mechanical connection mechanism 40 for mechanically connecting the road-wheel turning mechanism 30 to the steering wheel 21. The mechanical connection mechanism 40 includes first and second rotation shafts 41 and 42 and a connection mechanism 43.

The first rotation shaft 41 is connected to the steering wheel 21 via universal joints 44 and steering shaft 22, and steering force of the steering wheel 21 is transmitted to the first rotation shaft 41. The second rotation shaft 42 is connected to the road-wheel turning shaft 31 via a rack-and-pinion mechanism 45. The rack-and-pinion mechanism 45 includes a rack 46 formed on the road-wheel turning shaft 31, and a pinion 47 formed on the second rotation shaft 42. Road-wheel turning force by horizontal sliding movement of the road-wheel turning shaft 31 is transmitted from the rack-and-pinion mechanism 45 to the second rotation shaft 42. Thus, the second rotation shaft 42 rotates horizontally in response to leftward or rightward sliding movement of the road-wheel turning shaft 31.

The connection mechanism 43 interconnects the first and second rotation shafts 41 and 42 in such a manner that the first and second rotation shafts 41 and 42 can idle (i.e., rotate idle) relative to each other within a predetermined relative rotational angle range. Details of the connection mechanism 43 will be discussed later.

The gear 26 of the above-mentioned reaction force transmission mechanism 24 is provided on the first rotation shaft 41 or steering shaft 22, so that steering reaction force generated by the reaction motor 23 is transmitted to the steering wheel 21 via the first rotation shaft 41 or steering shaft 22.

The control section 51 not only receives detection signals from a steering angle sensor 52, steering torque sensor 53 and second rotation shaft angle sensor 54 but also receives detection signals from a vehicle velocity sensor 55 for detecting a traveling velocity of the vehicle, a yaw rate sensor 56 for detecting a yaw angle velocity (i.e., angular velocity of yaw motion), acceleration sensor 57 for detecting acceleration of the vehicle and various other sensors 58, to thereby issue control signals to the reaction motor 23 and road-wheel turning power motor 36.

The steering angle sensor 52 detects a steering angle θs of the steering wheel 21 by detecting, for example, a rotational angle of the first rotation shaft 41 or steering shaft 22. The steering torque sensor 53 detects a steering torque Ts of the steering wheel 21 by detecting, for example, torque of the first rotation shaft 41 or steering shaft 22. The second rotation shaft angle sensor 54 detects a rotational angle of the second rotation shaft 42.

Note that the steering angle sensor 52 may function also as the steering torque sensor 53. Further, a motor shaft rotational angle sensor (not shown) mounted within the reaction motor 23 may function also as the steering angle sensor 52 and steering torque sensor 53. The motor shaft rotational angle sensor detects a phase of a rotor by detecting a rotational angle of the motor shaft.

The control section 51 can acquire steering information based on steering operation of the steering wheel 21 on the basis of the detection signals from the steering angle sensor 52 and steering torque sensor 53. The steering information is indicative of at least one of the steering angle θs, steering angle velocity Vs, steering angle acceleration αs, steering torque Ts and differentiated value (i.e., change rate) ds of the steering torque Ts of the steering wheel 21. The steering angle velocity Vs and steering angle acceleration α s can be obtained by the control section 51 performing arithmetic operations based on the steering angle θ s of the steering wheel 21. Further, the differentiated value ds of the steering torque Ts can be obtained by the control section 51 performing arithmetic operations based on the steering torque Ts.

Namely, at least one of the steering angle θ s, steering angle velocity Vs, steering angle acceleration α s, steering torque Ts and differentiated value ds of the steering torque Ts of the steering wheel 21 is employed as the steering information. In this way, an optimal steer-by-wire type steering apparatus corresponding to any of various models can be provided by appropriately selecting optimal steering information corresponding to the model at development and design stages of the vehicle.

Further, the control section 51 can perform the following four control by controlling the reaction motor 23 to automatically set steering reaction force, corresponding to steering operation of the steering wheel 21, and impart the thus-set steering reaction force to the steering wheel 21.

First, if the gear 26 is rotated by the reaction motor 23 in a direction opposite from a steering direction of the steering wheel 21, the steering operation of the steering wheel 21 is reduced by steering reaction force generated by the reaction motor 23. Thus, in this case, steering force greater by the steering reaction force is required when the driver steering steers the steering wheel 21.

Second, if the gear 26 is rotated by the reaction motor 23 in the same direction as a steering direction of the steering wheel 21, steering reaction force generated by the reaction motor 23 is added to the steering operation of the steering wheel 21. Thus, only steering force smaller by the steering reaction force is required when the driver steering steers the steering wheel 21.

Third, when the steering wheel 21 is to be held at rest at a given angle, force for holding the steering wheel 21 is generated by the gear 26 being rotated, in a direction opposite from a direction in which the steering wheel 21 has been rotated so far, while the steering reaction force of the reaction motor 23 is being adjusted.

Fourth, when the steering wheel 21 is to be returned to its neutral position, steering reaction force for automatically returning the steering wheel 21 to the neutral position, which corresponds to so-called self-aligning force, is sent from the reaction motor 23 to the gear 26.

Further, the control section 51 can perform a variety of steering control using the reaction motor 23 that generates steering reaction force corresponding to the steering information. For example, when the rotational angle of the first rotation shaft 41 has come to almost fall outside the range of the predetermined relative rotational angle to the second rotation shaft 42, the control section 51 controls the reaction motor 23 to rapidly increase the steering reaction force to be generated by the motor 23. The human driver only has to suppress the steering angle θ s of the steering wheel 21 (refrain from further steering operation) when he or she has recognized the rapid steering reaction force increase.

However, in a case where the road-wheel turning actuator 35 generates a great road-wheel turning power, such as when the driver steers the steering wheel 21 during stoppage of the vehicle, the rotational angle of the first rotation shaft 41 may almost fall outside the range of the predetermined relative rotational angle to the second rotation shaft. In such a case, the control section 51 detects that the rotational angle of the first rotation shaft 41 has reached the range of the predetermined relative rotational angle, and then interconnects the steering wheel 21 and the road-wheel turning mechanism 30 through a mechanical connection path. Consequently, composite force, comprising a combination of the steering force applied by the driver and the road-wheel turning power of the road-wheel turning actuator 35 added to the steering force, is transmitted to the road-wheel turning mechanism 30 so that the road-wheel turning mechanism 30 can perform road-wheel turning operation. In this way, it is possible to reduce the road-wheel turning power to be generated by the road-wheel turning actuator 35 and thus downsize the road-wheel turning actuator 35.

Further, the control section 51 can automatically set a characteristic of an angle ratio of a steered angle of the road wheels 32 to the steering angle of the steering wheel 21, namely, a steering characteristic. In other words, because the road-wheel turning mechanism 30 is mechanically separated from the steering wheel 21, the control section 51 can set correspondence relationship between the steering angle of the steering wheel 21 and an operation amount of the road-wheel turning actuator 35, without being subject to mechanical limitations. As a result, the steering characteristic can be set flexibly in accordance with traveling conditions of the vehicle, such as a traveling velocity, turning degree and presence/absence of acceleration of the vehicle, which can thereby achieve an enhanced design freedom of the steering apparatus 10.

The following discuss details of the mechanical connection mechanism 40. FIG. 2A shows relationship between the steering wheel 21 and the mechanical connection mechanism 40, and FIG. 2B shows relationship of the road wheels 32 to the steering wheel 21 and mechanical connection mechanism 40.

Figure 2:
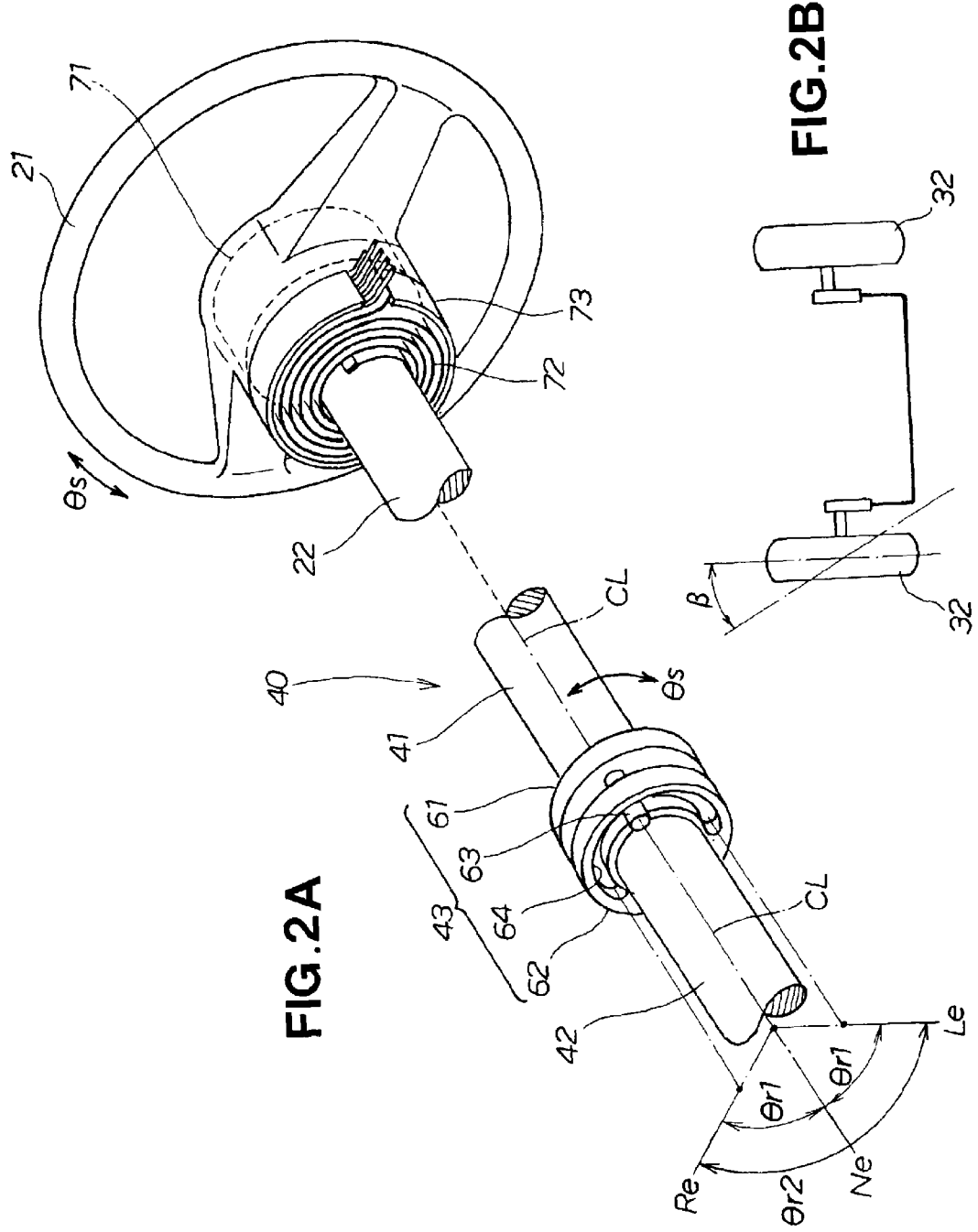
FIG. 2A is perspective view showing principal sections of a steering wheel and a mechanical connection mechanism shown in FIG. 1.
FIG. 2B is view showing relationship of the road wheels to the steering wheel and mechanical connection mechanism shown in FIG. 1.

As shown in FIG. 1 and FIG. 2A, the connection mechanism 43 has: a first flange 61 provided on one end of the first rotation shaft 41; a second flange 62 provided on one end of the second rotation shaft 42; a connection bar 63 provided on any one of the first and second flanges 61 and 62; and an elongated hole portion 64 formed in the other of the first and second flanges 61 and 62. The first and second rotation shafts 41 and 42 are located on the same axis line CL, i.e. in axial alignment with each other, and the first and second flanges 61 and 62 are axially opposed to each other. A gap may or may not be provided between the first and second flanges 61 and 62, as desired.

The following description will be given in relation to an example where the first flange 61 has the connection bar 63 and the second flange 62 has the elongated hole portion 64. The elongated hole portion 64 is an arcuate elongated hole portion formed axially through the second flange 62 and disposed centrally about the axis line CL. Left and right ends of the elongated hole portion 64 are indicated by Le and Re, respectively, in FIG. 2A-2B. A mid point Ne between the left and right ends Le and Re will hereinafter be referred to also as "reference point Ne in the rotational direction", and an angle from the reference point Ne to the left end Le and an angle from the reference point Ne to the right end Re are equal to each other and each indicated by θ r1. Therefore, an angle θ r2 from the left end Le to the right end Re (hereinafter referred to also as "predetermined relative rotational angle θ r2") is twice as large as the angle θ r1.

The connection bar 63 extends from the first flange 61 into the elongated hole portion 64. Thus, as the first and second rotation shafts 41 and 42 are rotated relative to each other, the connection bar 63 can idle (i.e., rotate idle) within the range, from the left end Le to the right end Re, of the elongated hole portion 64. Namely, the connection mechanism 43 interconnects the first and second rotation shafts 41 and 42 in such a manner that the first and second rotation shafts 41 and 42 can idle relative to each other within the range of the predetermined relative rotational angle θ r2.

The reference point Ne in the rotational direction corresponds to the neutral position of the steering wheel 21. Thus, when the steering wheel 21 is at the neutral position, the connection bar 63 is located at the reference point Ne in the rotational direction. The relative rotational angle θ r2 from the left end Le to the right end Re is set preferably at less than 360°. More preferably, the angle θ r1 from the reference point Ne in the rotational direction to each of the left and right ends Le and Re is set between 50° and 70°.

The first embodiment may be summarized as follows. Namely, in the first embodiment, the first rotation shaft 41 connected to the steering wheel 21 and the second rotation shaft 42 connected to the road-wheel turning mechanism 30 are interconnected in such a manner that the first and second rotation shafts 41 and 42 can rotate idle relative to each other within the range of the predetermined relative rotational angle θ r2.

Let's now assume a case where the steering wheel 21 and the road-wheel turning mechanism 30 are interconnected only via an electric connection path EL. As the steering wheel 21 is steered, the first rotation shaft 41 rotates leftward or rightward in accordance with the steering angle θ s of the steering wheel 21. Then, the road-wheel turning actuator 35 generates road-wheel turning power in accordance with steering operation information based on the steering operation of the steering wheel 21, and the thus-generated road-wheel turning power is transmitted to the road-wheel turning mechanism 30 so that the road wheels 32 are turned via the road-wheel turning mechanism 30.

Generally, the maximum road-wheel turning angle β (see FIG. 2B), at which the road wheels 32 can be turned via the road-wheel turning mechanism 30, is set in advance. For example, in the case where the steering apparatus 10 is an end take-off steering apparatus like the first embodiment, the maximum road-wheel turning angle β is restricted or limited by the stroke of the road-wheel turning shaft 31 being restricted by a stopper. Because the second rotation shaft 42 rotates horizontally leftward or rightward in response to operation of the road-wheel turning mechanism 30, the maximum rotational angle of the second rotation shaft 42 is limited to a range where the road wheels 32 can be turned via the road-wheel turning mechanism 30 through the maximum road-wheel turning angle β.

Further, in the first embodiment, the first rotation shaft 41 can freely rotate idle, without influencing the rotation of the second rotation shaft 42, only within the range of the predetermined relative rotational angle θ r2 to the second rotation shaft 42. The predetermined relative rotational angle of the first rotation shaft 41 to the second rotation shaft 42 may be set as appropriate within the range of the maximum rotational angle of the second rotation shaft 42. The maximum rotational angle of the first rotation shaft 41 falls within an angular range equal to a sum of the maximum rotational angle of the second rotation shaft 42 and predetermined relative rotational angle θ r2. Namely, the maximum rotational angle (maximum steering angle) of each of the first rotation shaft 41 and steering wheel 21 is limited in the first embodiment.

Similarly, in a case where the steering wheel 21 and the road-wheel turning mechanism 30 are interconnected only via the mechanical connection mechanism 40 (i.e., mechanical connection path), the maximum rotational angle of each of the first rotation shaft 41 and steering wheel 21 is limited.

Namely, the maximum rotational angle of each of the first rotation shaft 41 and steering wheel 21 is limited irrespective of whether the steering wheel 21 and the road-wheel turning mechanism 30 are interconnected via the electric connection path or via the mechanical connection path. As a result, in the steer-by-wire type vehicular steering apparatus 10, the steering angle θ s of the steering wheel 21 can be limited readily and reliably.

Further, as shown in FIG. 2A, the steering wheel 21 is equipped with an airbag device 71 and not-shown electric components. The airbag device 71 and an airbag control section (not shown) fixed to the vehicle body for issuing control signals to the airbag device are interconnected via a cable that is wound on a cable reel 73 attached to the steering wheel 21. The number of times the cable reel 73 can rotate is limited by the number of turns of the cable on the reel 73. Thus, if there is set no limit to the steering angle (number of rotations) of the steering wheel 21, an excessive load would be imposed on the cable reel 73 and cable 72. However, the first embodiment constructed in the above-described manner can limit the steering angle θ s of the steering wheel 21 readily and reliably and thereby can prevent an excessive load from being imposed on the cable reel 73 and cable 72.

Figure 3:
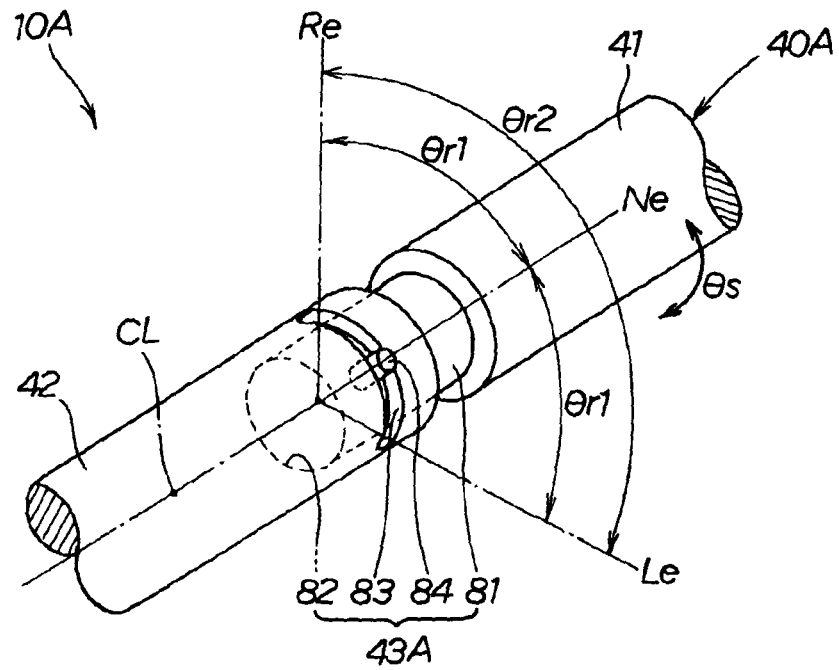
FIG. 3 is a perspective view showing a mechanical connection mechanism employed in a second embodiment of the vehicular steering apparatus of the present invention.

Next, a description will be given about a second embodiment of the vehicular steering apparatus. FIG. 3 shows a mechanical connection mechanism 40A employed in the second embodiment of the vehicular steering apparatus 10A. The second embodiment of the vehicular steering apparatus 10A is different from the first embodiment 10 in that it employs the mechanical connection mechanism 40A that is a modification of the mechanical connection mechanism 40 shown in FIG. 2A. The other elements in the second embodiment 10A are similar to those in the first embodiment 10 shown in FIGS. 1 and 2A-2B and thus will not be described here to avoid unnecessary duplication.

More specifically, the mechanical connection mechanism 40 includes the first and second rotation shafts 41 and 42 and a connection mechanism 43A. The connection mechanism 43A interconnects the first and second rotation shafts 41 and 42 in such a manner that the first and second rotation shafts 41 and 42 can rotate idle relative to each other within the range of the predetermined relative rotational angle θ r2. The connection mechanism 43A includes: a fitting shaft portion 81 provided on one end of the first rotation shaft 41; a bottomed fitting hole portion 82 formed in one end of the second rotation shaft 42; an elongated hole portion 83 formed in the one end of the second rotation shaft 42; and a connection bar 84 provided on the fitting shaft portion 81. The fitting shaft portion 81 is fitted in the fitting hole portion 82 in such a manner that it is rotatable relative to the fitting hole portion 82 and hence to the second rotation shaft 42.

The elongated hole portion 83 is elongated in a circumferential direction of the second rotation shaft 42 and communicates with the fitting hole portion 82. The angle from the reference point Ne to the left end Le and the angle from the reference point Ne to the right end Re are equal to each other and each indicated by θ r1. Therefore, the angle θ r2 from the left end Le to the right end Re is twice as large as the angle θ r1. The connection bar 84 extends from the fitting shaft portion 81 into the elongated hole portion 83. Thus, as the first and second rotation shafts 41 and 42 are rotated relative to each other, the connection bar 63 can idle within the range, from the left end Le to the right end Re, of the elongated hole portion 83.

Behavior and advantageous benefits of the second embodiment of the vehicular steering apparatus 10A are substantially the same as those of the first embodiment of the vehicular steering apparatus 10 and thus will not be described here to avoid unnecessary duplication.

Figure 4:
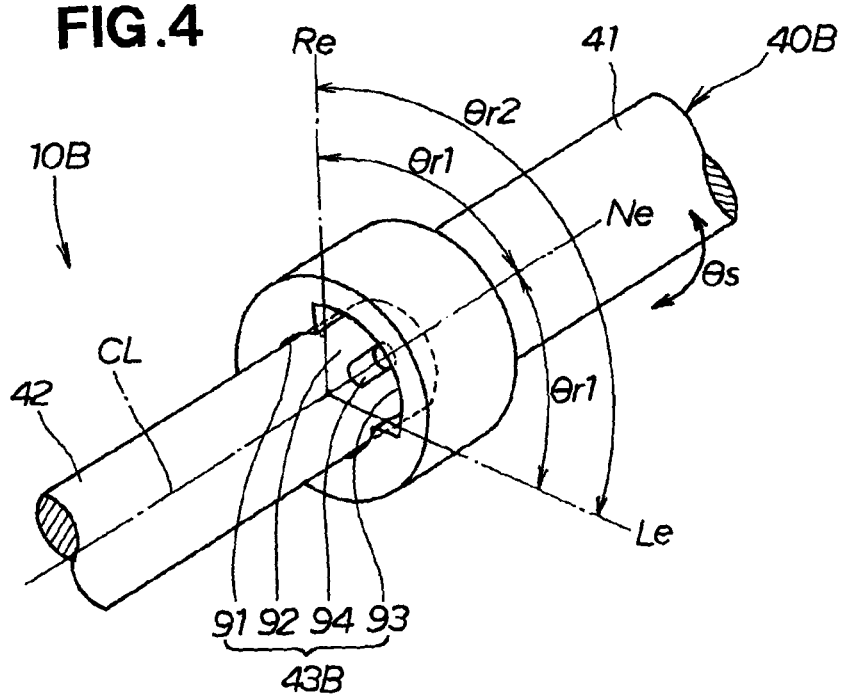
FIG. 4 is a perspective view showing a mechanical connection mechanism employed in a third embodiment of the vehicular steering apparatus of the present invention.

Next, a description will be given about a third embodiment of the vehicular steering apparatus 10B. FIG. 4 shows a mechanical connection mechanism 40B employed in the third embodiment of the vehicular steering apparatus 10B. The third embodiment of the vehicular steering apparatus 10B is different from the first embodiment 10 in that it employs the mechanical connection mechanism 40B that is a modification of the mechanical connection mechanism 40 shown in FIG. 2A. The other elements in the third embodiment 10B are similar to those in the first embodiment 10 shown in FIGS. 1 and 2A-2B and thus will not be described here to avoid unnecessary duplication.

More specifically, the mechanical connection mechanism 40B in the third embodiment 10B includes the first and second rotation shafts 41 and 42 and the connection mechanism 43B. The connection mechanism 43B interconnects the first and second rotation shafts 41 and 42 in such a manner that the first and second rotation shafts 41 and 42 can rotate idle relative to each other within the range of the predetermined relative rotational angle θ r2. The connection mechanism 43B includes: a fitting hole portion 91 formed in one end of the first rotation shaft 41; a fitting shaft portion 92 provided on one end of the second rotation shaft 42; an elongated hole portion 93 formed in the inner circumferential surface of the fitting hole portion 91; and a connection bar 94 provided on the fitting shaft portion 92. The fitting shaft portion 92 is fitted in the fitting hole portion 91 in such a manner that it is rotatable relative to the fitting hole portion 91 and hence to the first rotation shaft 41.

The elongated hole portion 93 is an arcuate groove elongated along the inner circumferential surface of the fitting hole portion 91 and opens into (i.e., communicates with) the fitting hole portion 91. The angle from the reference point Ne to the left end Le and the angle from the reference point Ne to the right end Re are equal to each other and each indicated by θ r1. Therefore, the angle θ r2 from the left end Le to the right end Re is twice as large as the angle θ r1. The connection bar 94 extends from the fitting shaft portion 92 into the elongated groove 93. Thus, as the first and second rotation shafts 41 and 42 are rotated relative to each other, the connection bar 94 can idle within the range, from the left end Le to the right end Re, of the elongated groove 93.

Behavior and advantageous benefits of the third embodiment of the vehicular steering apparatus 10B are substantially the same as those of the first embodiment of the vehicular steering apparatus 10 and thus will not be described here to avoid unnecessary duplication.

Figure 5A:
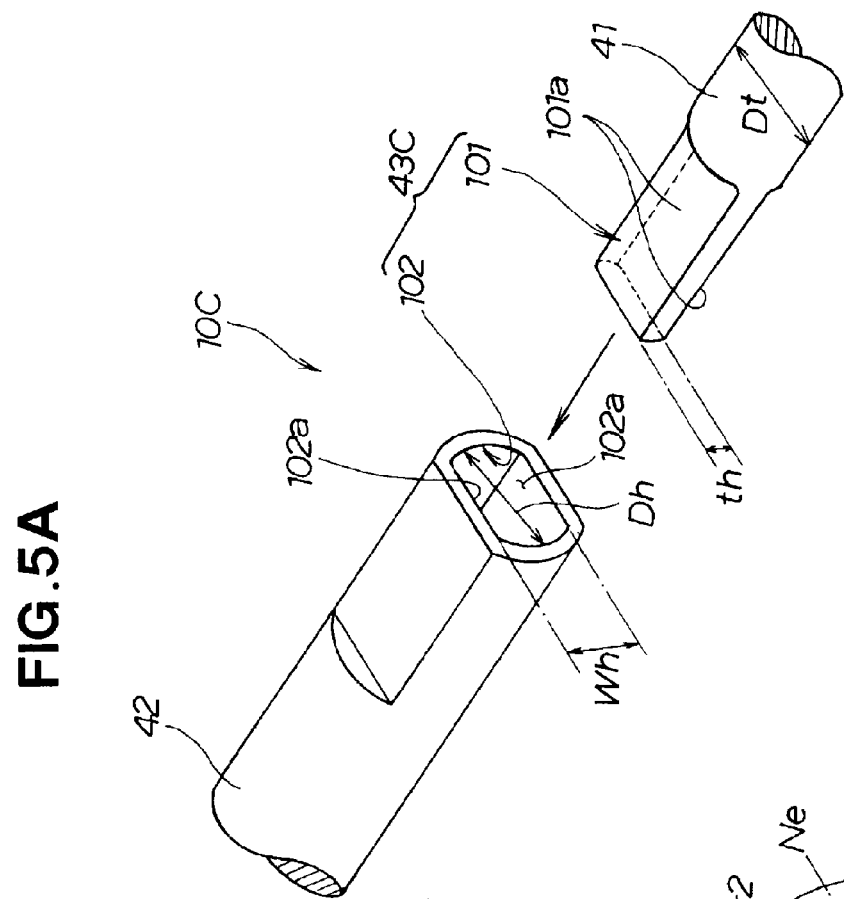
FIG. 5A is an exploded perspective view showing a mechanical connection mechanism employed in a fourth embodiment of the vehicular steering apparatus of the present invention.
Figure 5B:
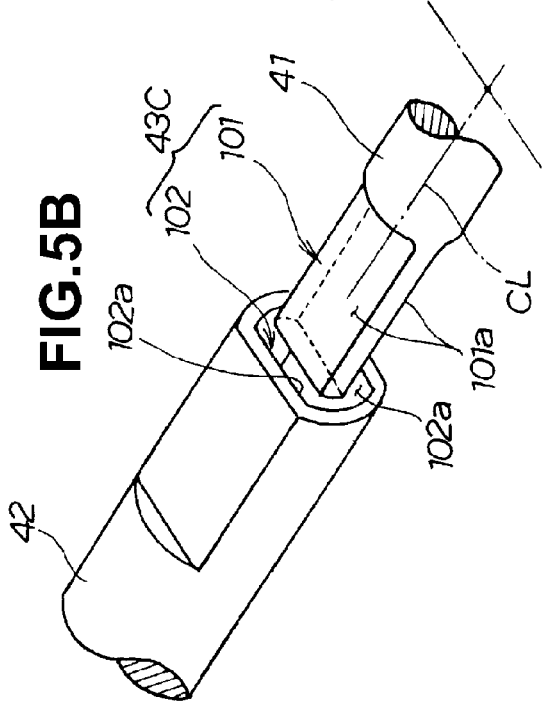
FIG. 5B is a perspective view showing the mechanical connection mechanism in the process of being assembled.
Figure 5C:
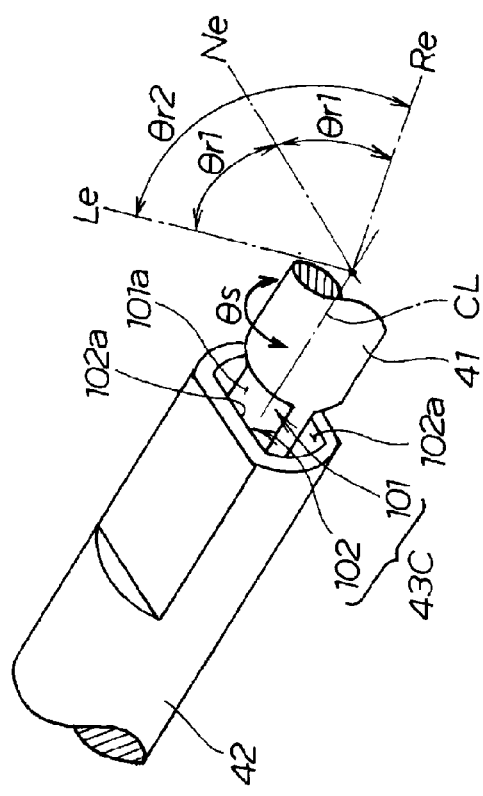
FIG. 5C is a perspective view showing the mechanical connection mechanism 40C in an assembled state.

Next, a description will be given about a fourth embodiment of the vehicular steering apparatus 10C. FIGS. 5A-5C show a mechanical connection mechanism 40C employed in the fourth embodiment of the vehicular steering apparatus 10C. More specifically, FIG. 5A is an exploded view of the mechanical connection mechanism 40C, FIG. 5B shows the mechanical connection mechanism 40C in the process of being assembled, and FIG. 5C shows the mechanical connection mechanism 40C in an assembled state.

The fourth embodiment of the vehicular steering apparatus 10C is different from the first embodiment 10 in that it employs the mechanical connection mechanism 40C that is a modification of the mechanical connection mechanism 40 shown in FIG. 2A. The other elements in the fourth embodiment 10C are similar to those in the first embodiment 10 shown in FIGS. 1 and 2A-2B and thus will not be described here to avoid unnecessary duplication.

More specifically, the mechanical connection mechanism 40C in the fourth embodiment 10C includes the first and second rotation shafts 41 and 42 and the connection mechanism 43C. The connection mechanism 43C interconnects the first and second rotation shafts 41 and 42 in such a manner that the first and second rotation shafts 41 and 42 can rotate idle relative to each other within the range of the predetermined relative rotational angle θ r2.

The connection mechanism 43C includes a fitting shaft portion 101 provided on one end of the first rotation shaft 41, and a bottomed fitting hole portion 102 formed in one end of the second rotation shaft 42. The fitting shaft portion 101 is formed in a flat plate shape having a thickness th and a width Dt that is equal to a diameter of the first rotation shaft 41. The fitting hole portion 102 has an elongated cross-sectional shape having a maximum inner width Dh and a minimum inner width Wh. The maximum inner width Dh of the fitting hole portion 102 is slightly greater than the width Dt of the fitting shaft portion 101, and the minimum inner width Wh of the fitting hole portion 102 is slightly greater than the thickness th of the fitting shaft portion 101.

The fitting shaft portion 101 is fitted in the fitting hole portion 102. Because the minimum inner width Wh of the fitting hole portion 102 is slightly greater than the thickness th of the fitting shaft portion 101, a slight gap is left between the fitting shaft portion 101 and the fitting hole portion 102, and thus, the fitting shaft portion 101 is slightly rotatable relative to the fitting hole portion 102 until a flat surface 101a of the fitting shaft portion 101 contacts an inner flat surface 102a of the fitting hole portion 102.

When the flat surface 101a of the fitting shaft portion 101 lies parallel to the inner flat surface 102a of the fitting hole portion 102, the first rotation shaft 41 may be said to be located at the reference point Ne in the rotational direction. Then, as the first rotation shaft 41 is turned leftward (counterclockwise) in FIGS. 5A-5C, the flat surfaces 101a and 102a contact each other at a left end Le that may be said to be a left rotation limit point. The left rotation limit point Le corresponds to the left end Le of the elongated hole portion 64 provided in the first embodiment shown in FIG. 2A. On the other hand, as the first rotation shaft 41 is turned rightward (clockwise) in FIGS. 5A-5C, the flat surfaces 101a and 102a contact each other at a right end Re that may be said to be a right rotation limit point. The right rotation limit point Re corresponds to the right end Re of the elongated hole portion 64 provided in the first embodiment shown in FIG. 2A.

An angle from the reference point Ne to the left rotation limit point Le and an angle from the reference point Ne to the right rotation limit point Re are equal to each other and each indicated by θ r1. Therefore, an angle θ r2 from the left rotation limit point Le to the right rotation limit point Re is twice as large as the angle θ r1. As the first and second rotation shafts 41 and 42 are rotated relative to each other, the fitting shaft section 101 can idle within the range, from the left end Le to the right end Re, of the fitting hole portion 102.

Behavior and advantageous benefits of the fourth embodiment of the vehicular steering apparatus 10C are substantially the same as those of the first embodiment of the vehicular steering apparatus 10 and thus will not be described here to avoid unnecessary duplication.

Figure 6:
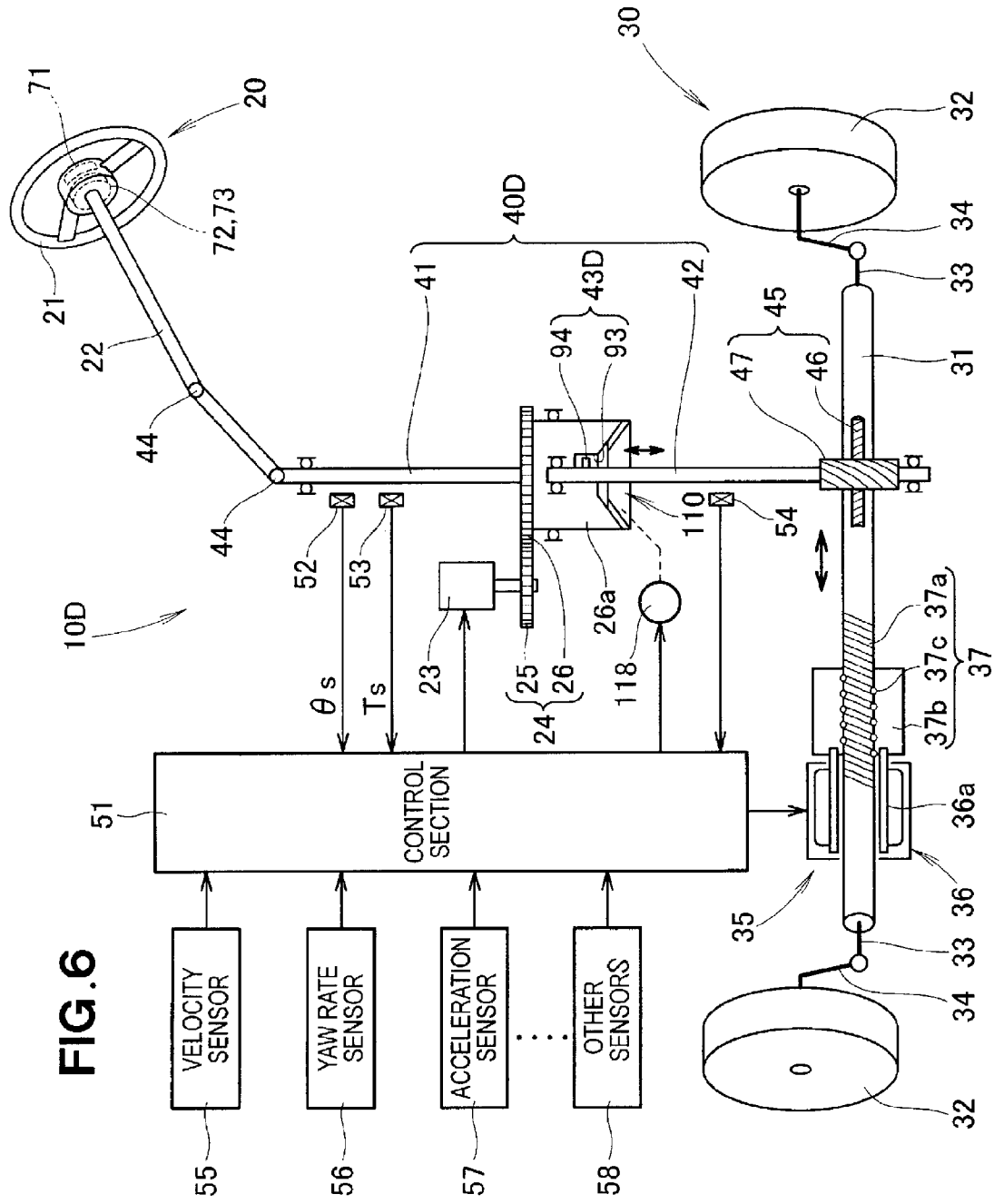
FIG. 6 is a block diagram shows a general construction of a fifth embodiment of the vehicular steering apparatus of the vehicular steering apparatus of the present invention.

Next, a description will be given about a fifth embodiment of the vehicular steering apparatus 10D, with reference to FIGS. 6 to 10A-10B. FIG. 6 schematically shows a general construction of the fifth embodiment of the vehicular steering apparatus 10D, and FIG. 7 shows the reaction motor 23, reaction force transmission mechanism 24, mechanical connection mechanism 40D and clutch 110 of FIG. 6 in an assembled-together state.

Figure 7:
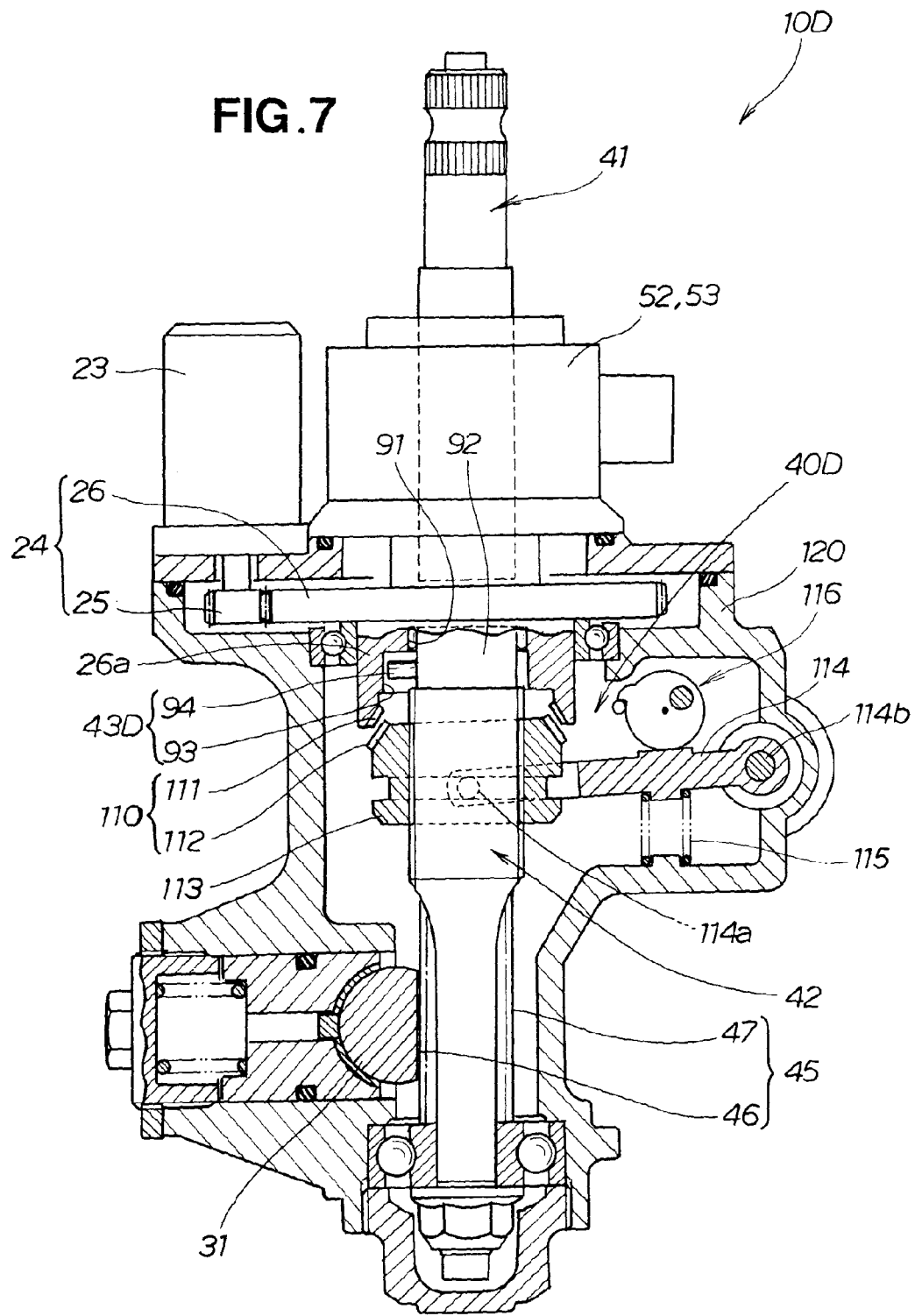
FIG. 7 is a partly-sectional view showing an assembled-together state of a reaction motor, reaction force transmission mechanism, mechanical connection mechanism and clutch shown in FIG. 6.

As shown in FIGS. 6 and 7, the fifth embodiment of the vehicular steering apparatus 10D is characterized by provision of the mechanical connection mechanism 40D and clutch 110. The other elements in the fifth embodiment 10D are similar to those in the first embodiment 10 shown in FIGS. 1 and 2A-2B and thus will not be described here to avoid unnecessary duplication. The reaction force transmission mechanism 24, road-wheel turning shaft 31, second rotation shaft 42, rack-and-pinion mechanism 45 and clutch 110 are accommodated in a housing 120.

The mechanical connection mechanism 40D shown in FIGS. 6 and 7 is a modification of the mechanical connection mechanism 40 shown in FIG. 2A. The mechanical connection mechanism 40D includes the first and second rotation shafts 41 and 42 and a connection mechanism 43D.

The connection mechanism 43D, which is of substantially the same construction as the connection mechanism 43B shown in FIG. 4, comprises a combination of a fitting hole portion 91, fitting shaft portion 92, elongated groove portion 93 and connection bar 94. The fitting hole portion 91 is formed in a boss 26a of the gear 26, and the boss 26a is mounted on the first rotation shaft 41. The fitting shaft portion 92 is provided on one end of the second rotation shaft 42. The elongated groove portion 93 is formed in the inner circumferential surface of the fitting hole portion 91, and the connection bar 94 is provided on the fitting shaft portion 92.

Figure 8:
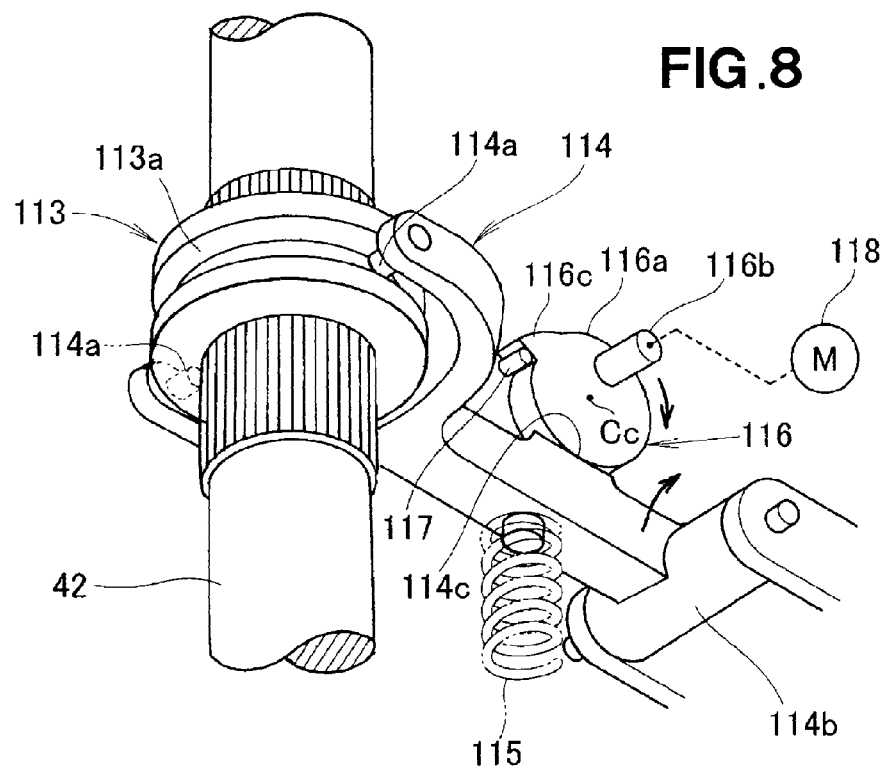
FIG. 8 is a perspective view of a clutch shown in FIG. 7.
Figure 9:
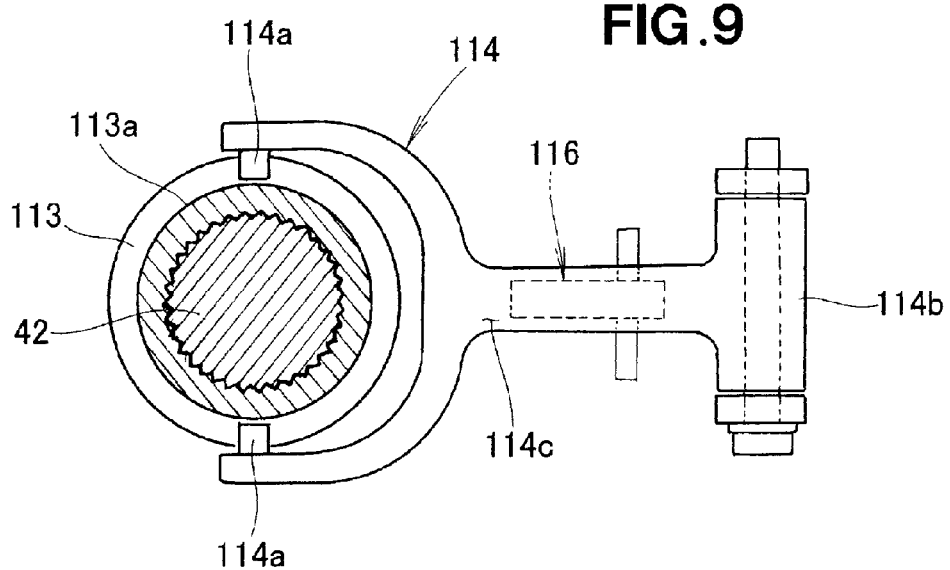
FIG. 9 is a plan view of the clutch shown in FIG. 8.

As shown in FIGS. 7 to 9, the clutch 110 comprises a generally cone-shaped dog clutch. More specifically, the clutch 110 includes a tapered female clutch section 111 disposed centrally about the second rotation shaft 42, and a tapered male clutch section 112 disposed centrally about the second rotation shaft 42. The tapered female clutch section 111 has a tapering surface formed on one end portion of the boss 26a of the gear 26, and clutch teeth formed on the tapering surface. The tapered male clutch section 112 has a tapering surface formed on one end portion of a clutch shifter 113, and clutch teeth formed on the tapering surface. The clutch 110 turns to a clutch-on state (hereinafter "ON state") when the clutch teeth of the female and male clutch sections 111 and 112 have been brought into meshing engagement with each other.

The clutch shifter 113 is mounted on the second rotation shaft 42 in such a manner that it is axially slidable relative to the second rotation shaft 42 but non-rotatable relative to the second rotation shaft 42. The clutch shifter 113 has a circumferential groove 113a formed therein along its entire outer circumferential surface, and two distal end portions 114a of a shift fork 114 are fitted in the circumferential groove 113a. The shift fork 114, which is a pivot member extending in a direction substantially perpendicular to the second rotation shaft 42, is mounted at its proximal end portion 114b to the housing 120 in such a manner that it is pivotable substantially in the axial direction of the second rotation shaft 42.

The shift fork 114 is normally biased by a compression coil spring (biasing member) 115 in such a direction where the clutch shifter 113 axially slides to cause the male clutch section 112 to mesh with the female clutch section 111.

Figure 10A:
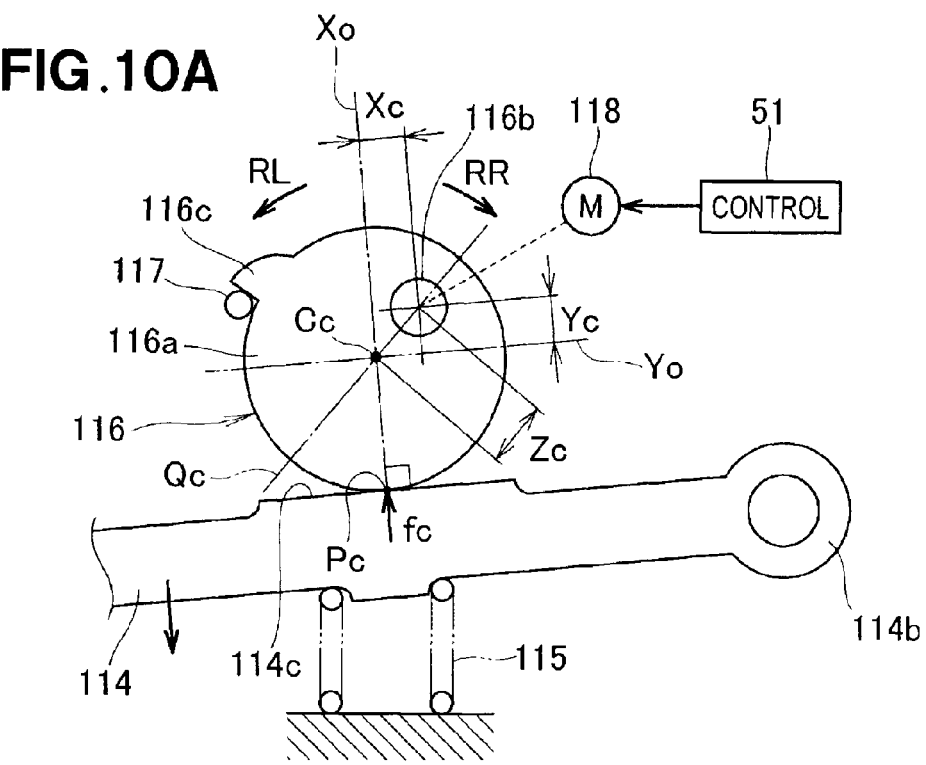
FIGS. 10A and 10B are views explanatory of a construction and behavior of the clutch shown in FIG. 7.
Figure 10B:
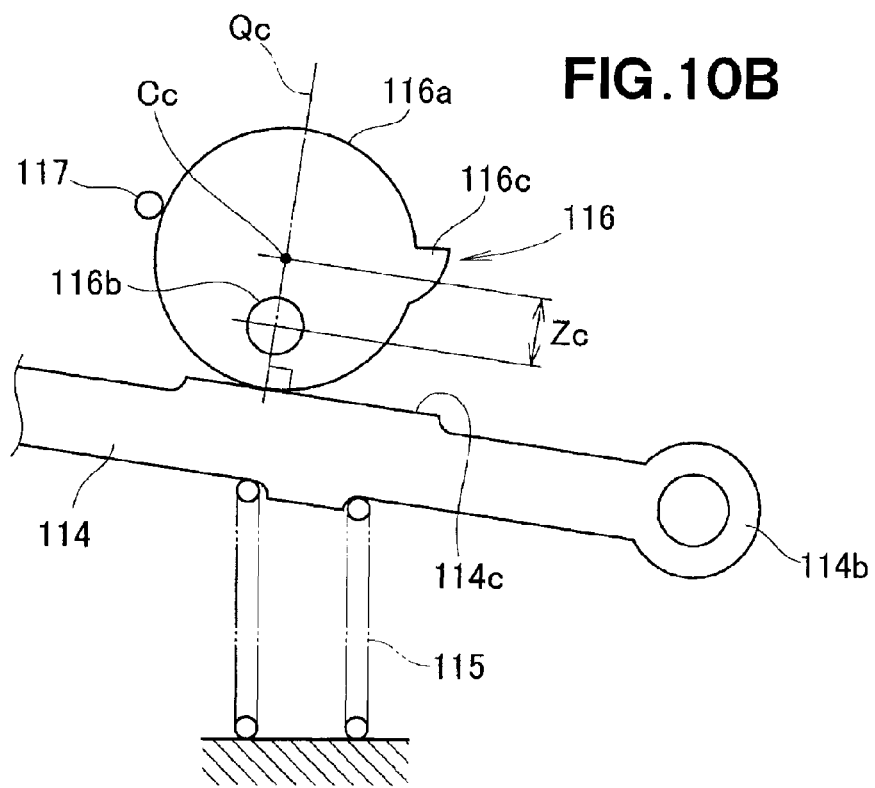

FIG. 10A shows the shift fork 114 in a clutch-off state (hereinafter "OFF" state), while FIG. 10B shows the shift fork 114 in the ON state. The shift fork 114 is pressed against the compression coil spring 115 by means of an eccentric cam 116. Namely, the eccentric cam 116 is disposed in contact with a flat contact surface 114c of the shift fork 114 located opposite from the compression coil spring 115.

As shown in FIGS. 7 to 10A, the eccentric cam 116 includes a disk-shaped cam body 116a, a rotation shaft 116b for the disk-shaped cam body 116a, and an engaging projection 116c projecting radially outwardly from the outer circumferential surface of the cam body 116a.

As shown in FIG. 10A, the cam body 116a is formed in a true circle shape as viewed in side elevation. The outer circumferential surface of the cam body 116a contacts the flat contact surface 114c at a contact point Pc. An imaginary line perpendicularly intersecting the contact surface 114c at the contact point Pc is indicated as a vertical line Xo, and an imaginary line passing the center Cc of the cam body 116a in parallel to the flat contact surface 114c is indicated as a horizontal line Yo. The vertical line Xo and the horizontal line Yo perpendicularly intersect each other. The cam body 116a has the center Cc located at an intersection point between the vertical line Xo and the horizontal line Yo.

The eccentric cam 116 rotates about the rotation shaft 116b that is offset by a predetermined offset distance Zc radially outwardly from the center Cc of the cam body 116a, and the rotation shaft 116b is rotatably supported by the housing 120 (FIG. 7). An imaginary straight line Qc passing the center Cc of the cam body 116a and the rotation shaft 116b is inclined relative to the contact surface 114c. The offset distance Zc is set on the basis of an amount of pivoting movement of the shift fork 114 necessary for switching between the ON and OFF states of the clutch 10 (see FIG. 7).

More specifically, FIG. 10A shows the cam 116 in the OFF state as viewed in the axial direction of the rotation shaft 116b. In the OFF state, the center of the rotation shaft 116b is not only offset by a predetermined first offset distance Xc from the vertical line Xo toward the proximal end portion 114b of the shift fork 114, but also offset by a predetermined second offset distance Yc from the horizontal line Yo in a direction opposite from the contact surface 114c. Further, the engaging projection 116c and a stopper 117 for locking the engaging projection 116c are offset from the vertical line Xo in a direction opposite from the rotation shaft 116b.

In the OFF state, the control section 51 keeps issuing a drive instruction signal to an electric motor 118. The electric motor 118 is supplied with a small current to keep rotating its rotation shaft 116b in a counterclockwise direction (direction of arrow RL) in the figure, Thus, the eccentric cam 116 remains stationary with the engaging projection 116c locked by the stopper 117. In this state, the eccentric cam 116 keeps the clutch shifter 113 in a depressed position by depressing the shift fork 114 against the biasing force of the compression coil spring 115. Thus, the clutch 110 is normally maintained in the OFF (disconnected) state.

As noted above, the offset distance Zc is set on the basis of the necessary amount of pivoting amount of the shift fork 114. To secure the offset distance Zc, the rotation shaft 116b is offset by the first offset distance Xc from the vertical line Xo and offset by the second offset distance Yc from the horizontal line Yo; namely, the rotation shaft 116b is offset relative to both of the vertical line Xo and horizontal line Yo passing the center Cc of the cam body 116a.

At the contact point Pc, the biasing force fc of the compression coil spring 115 acts from the contact surface 114c of the shift fork 114 on the outer circumferential surface of the cam body 116a in the direction of the vertical line Xo. Based on the biasing force fc, torque (biasing torque) acting on the rotation shaft 116 is proportional to the first offset distance Xc. Because the rotation shaft 116b is offset relative to both of the vertical line Xo and horizontal line Yo in the instant embodiment, it is possible to reduce the first offset distance Xc. As a consequence, necessary driving torque of the electric motor 118 can be reduced. Thus, it is possible to reduce the electric current to be supplied to the electric motor 118 and downsize the electric motor 118.

Once the electric connection path EL from the steering wheel 21 to the road-wheel turning mechanism 30 is canceled or deactivated in the vehicular steering apparatus 10D shown in FIG. 6, the control section 51 issues a stop instruction signal to the electric motor 118. Once the electric motor 118 is deactivated in response to the stop instruction signal, the shift fork 114 pivots toward the center Cc of the cam body 116a by the biasing force fc of the compression coil spring 115. Thus, the cam body 116a is pressed by the shift fork 114 so that it rotates about the rotation shaft 116b in a clockwise direction in FIG. 10A, as indicated by arrow PR, to assume a position shown in FIG. 10B, i.e. a position where the contact surface 114c is located closest to the rotation shaft 116b. At that time, the imaginary straight line Qc passing the center Cc of the cam body 116a and the center of the rotation shaft 116b intersects the contact surface 114c.

Namely, upon deactivation of the electric motor 118, the shift fork 114 pivots to slide the clutch shifter 113 of FIG. 7 in such a manner that the male clutch section 112 is brought into meshing engagement with the female clutch section 111, and thus, the clutch 110 is brought into the ON (connected) state. By the clutch 110 being reversed from the normal or OFF state to the ON state, the first and second rotation shafts 41 and 42 are compulsorily interconnected irrespective of the connecting state of the connection mechanism 43D.

Then, once the control section 51 issues a rotation instruction signal to the electric motor 118, the electric motor 118 rotates so that the clutch 110 returns to the OFF (disconnected) state.

Note that the clutch 110 may be a generally cone-shaped friction clutch rather than a generally cone-shaped dog clutch. In any event, the clutch 110 can be implemented in a relatively simple construction of a generally cone-shaped dog clutch or generally cone-shaped friction clutch.

The relative rotational angle between the first and second rotation shafts 41 and 42 is limited to the range of $\theta$ r2 (see FIG. 4) by means of the connection mechanism 43D. For example, while the left end Le of the elongated groove portion 93 (FIG. 4) is in contact with the connection bar 94, the elongated groove portion 93 is prevented from rotating further leftward, namely, the first rotation shaft 41 is prevented from rotating leftward relative to the second rotation shaft 42. Thus, even when a great leftward steering force is provided in the first rotation shaft 41 so that the relative rotational angle would become excessive due to an excessive leftward steering force produced in the first rotation shaft 41, the great steering force from the first rotation shaft 41 is transmitted to the second rotation shaft 42 via the connection mechanism 43D. As a consequence, a great steering force more than a predetermined level would not act on the clutch 110. Namely, it is possible to reduce maximum transmission force (maximum transmission torque) transmittable via the clutch 110.

Similar behavior occurs when force is applied to further rotate the elongated groove portion 93 rightward relative to the connection bar 94 with the right end Re (FIG. 4) held in contact with the connection bar 94.

By reducing the maximum transmission force transmittable by the clutch 110 in the aforementioned manner, it is possible to downsize the clutch 110. Such a downsizing benefit of the clutch 110 is remarkable particularly in the case where a con-shaped friction clutch is employed as the clutch 110.

According to the above-described fifth embodiment, the clutch 11 is reversed from the OFF state to the ON state once the "electric connection path" EL shown in FIG. 6 is deactivated. As a consequence, the steering wheel 21 and the road-wheel turning mechanism 30 are interconnected via the mechanical connection path. Namely, once the electric connection path EL is canceled or deactivated for some reason, the connection between the steering wheel 21 and the road-wheel turning mechanism 30 is automatically switched via the clutch 110 to the mechanical connection path (mechanical connection mechanism 40) reliably and promptly.

Next, a description will be given about a sixth embodiment of the vehicular steering apparatus 10E, with reference to FIGS. 11 to 12A-12C. The sixth embodiment of the vehicular steering apparatus 10E is characterized by provision of a mechanical connection mechanism 40E and clutch 140. The other elements in the sixth embodiment 10E are similar to those in the fifth embodiment shown in FIG. 6 and thus will not be described here to avoid unnecessary duplication.

The mechanical connection mechanism 40E in the sixth embodiment includes the first and second rotation shafts 41 and 42 and the connection mechanism 43E. The connection mechanism 43E interconnects the first and second rotation shafts 41 and 42 in such a manner that the first and second rotation shafts 41 and 42 can rotate idle relative to each other within the range of the predetermined relative rotational angle $\theta$ r2.

The connection mechanism 43E includes: a fitting shaft portion 131 provided on one end of the first rotation shaft 41; a bottomed fitting hole portion 132 formed in one end of the second rotation shaft 42; a connection bar 133 provided on the fitting shaft portion 131; a slider 134; and a cam hole portion 135 formed in the slider 134. The fitting shaft portion 131 is fitted in the fitting hole portion 132 in such a manner that it is rotatable relative to the fitting hole portion 132.

The slider 134 is a cylindrical member disposed coaxially with the first and second rotation shafts 41 and 41 and extends through a fitting portion between the first and second rotation shafts 41 and 41. The slider 134 is mounted, for example by serration coupling, in such a manner that it is non-rotatable relative to the second rotation shaft 42 but axially slidable relative to the second rotation shaft 42. Further, the slider 134 is both rotatable and axially slidable relative to the first rotation shaft 41. The clutch shifter 113 is mounted to the slider 134.

The clutch shifter 113, shift fork 114, eccentric cam 116, stopper 117 and electric motor 118 (see FIG. 8) employed in the sixth embodiment are substantially similar to those in the fifth embodiment shown in FIGS. 7 to 10A-10B and will not be described here to avoid unnecessary duplication.

The shift fork 114 is normally biased by a torsional coil spring (biasing member) 115E, which is employed in place of the compression coil spring 115 shown in FIGS. 7 to 10A-10B, in such a direction as to axially slide the clutch shifter 113 so that the clutch 144 is brought into the ON state.

Figure 12A:
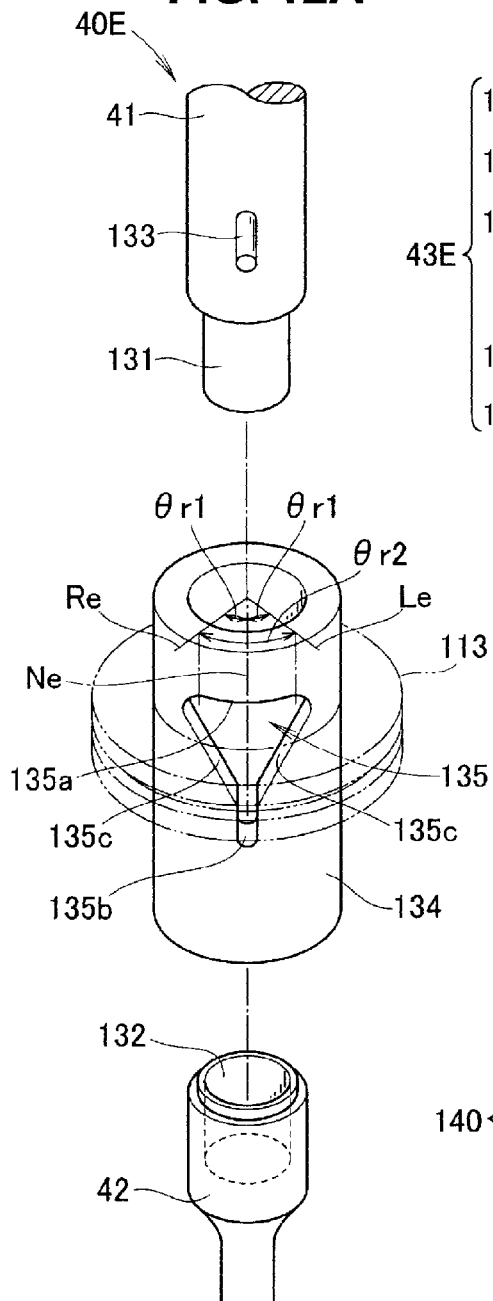
FIG. 12A is an exploded view explanatory of constructions of a mechanical connection mechanism and a clutch shown in FIG. 11.
Figure 12B:
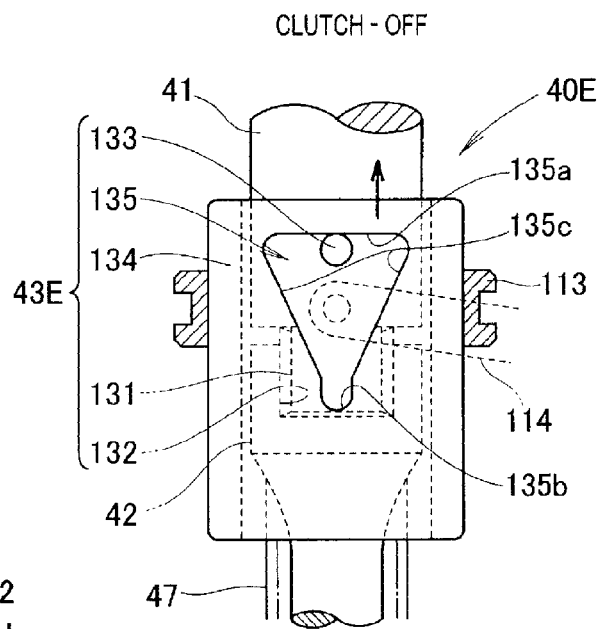
FIG. 12B is a view explanatory of constructions of a mechanical connection mechanism and a clutch in an assembled-together state shown in FIG. 11.
Figure 12C:
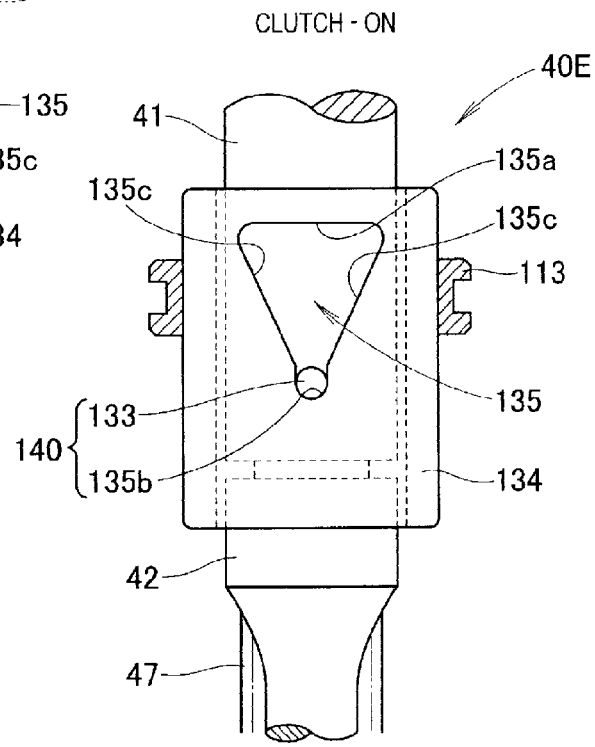
FIG. 12C is a view explanatory of constructions of a mechanical connection mechanism and a clutch having the clutch in OFF state shown in FIG. 11.

FIG. 12A is an exploded view of the mechanical connection mechanism 40E and clutch 140, FIG. 12B shows the mechanical connection mechanism 40E and clutch 140 in an assembled-together state, and FIG. 12C shows the clutch 140 in the OFF state.

As shown in FIGS. 12A and 12B, the cam hole portion 135 is formed through the thickness of a circumferential side wall of the slider 134 and has a substantially triangular shape as viewed from a circumferential side of the slider 135. The substantially triangular cam hole portion 135 is disposed in a vertically reversed orientation with a base surface 135a located closer to the first rotation shaft 41 and a vertex located closer to the second rotation shaft 42, and it also has an engaging recess 135b formed in the vertex.

The base surface 135a located closer to the first rotation shaft 41 is a horizontal surface extending perpendicularly to the first rotation shaft 41. The engaging recess 135b has a width (dimension in the circumferential direction of the slider 134) set so that the connection bar 133 can fit therein with a minute gap. The substantially triangular cam hole portion 135 has a pair of left and right oblique side surfaces between the opposite ends of the base surface 135c and the engaging recess 135b. Namely, the cam hole portion 135 tapers toward the engaging recess 135b.

An angle from the reference point Ne in the rotational direction to the left rotation limit point Le and an angle from the reference point Ne to the right rotation limit point Re are equal to each other and each indicated by $\theta$ r1. Therefore, an angle $\theta$ r2 from the left rotation limit point Le to the right rotation limit point Re is twice as large as the angle $\theta$ r1. The connection bar 133 extends from the fitting shaft portion 131 into the cam hole portion 135. As the first and second rotation shafts 41 and 42 are rotated relative to each other, the connection bar 133 can idle within the range of the cam hole portion 135, i.e. from the left end Le to the right end Re.

Figure 11:
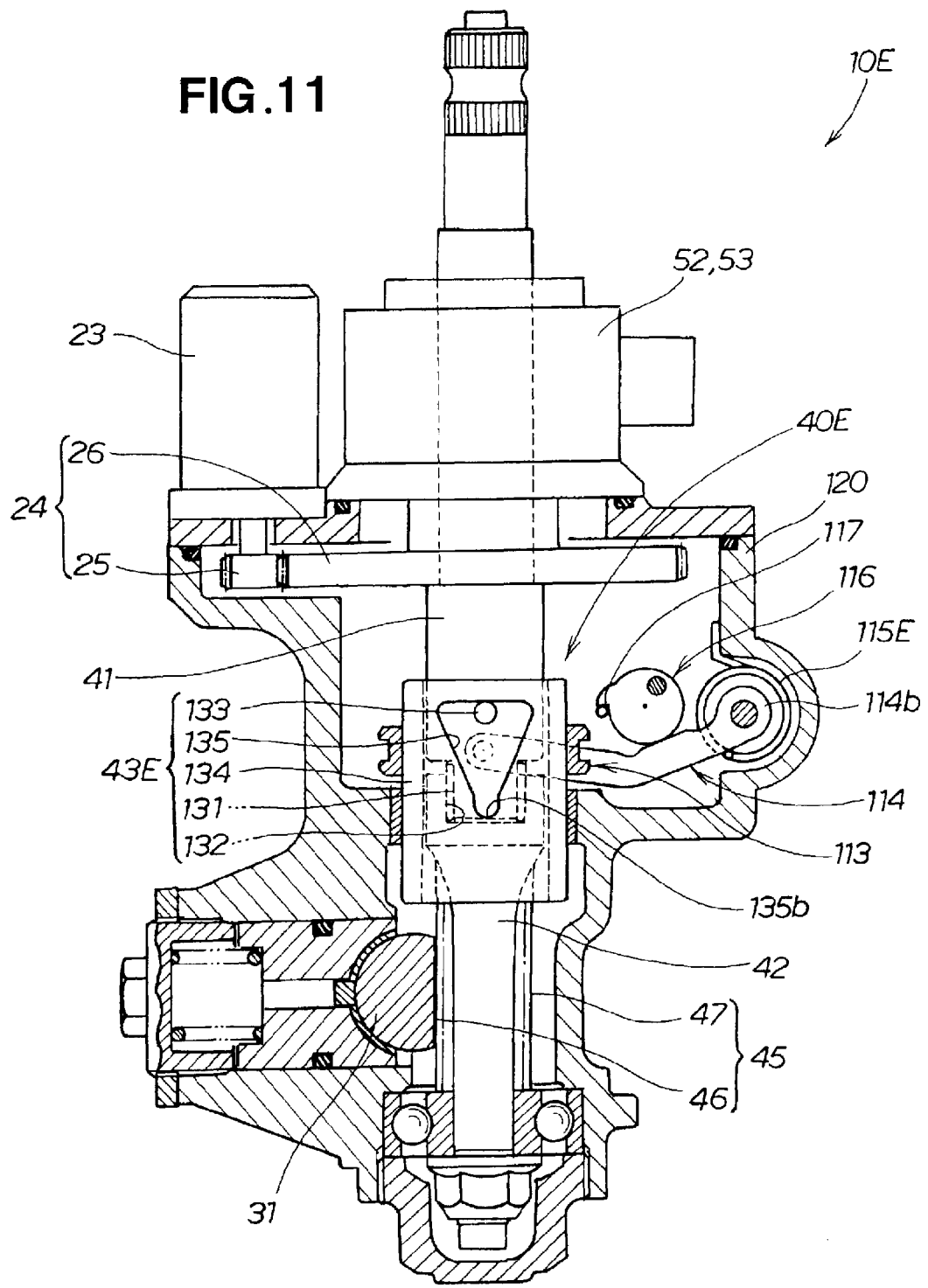
FIG. 11 is a block diagram showing a general construction of a sixth embodiment of the vehicular steering apparatus of the vehicular steering apparatus of the present invention.

As shown in FIG. 12C, the clutch 140 comprises the connection bar 133 and the cam hole portion 135. Also, as shown in FIG. 11 and FIG. 12B, the clutch 140 is normally maintained in the OFF start (disconnected state) with the engaging recess 135b located out of fitting engagement with the connection bar 133.

Then, once the control section 51 issues a stop instruction signal to the electric motor 118, the electric motor 118 is deactivated. Thus, the shift fork 114 axially slides, via the clutch shifter 113, the slider 134 toward the proximal end of the first rotation shaft 41, during which time the cam hole portion 135 is guided by the connection bar 133. As the slider 134 slides as above, the idling range between the connection bar 133 and the cam hole portion 135 is narrowed, and ultimately, the engaging recess 135b fittingly engages the connection bar 133. As a consequence, the clutch 140 is brought into the ON (connected) state. By the clutch 140 being reversed from the normal or OFF state to the ON state, the first and second rotation shafts 41 and 42 are compulsorily interconnected.

Then, once the control section 51 issues a rotation instruction signal to the electric motor 118, the electric motor 118 rotates so that the clutch 140 returns to the OFF (disconnected) state.

According to the above-described sixth embodiment, the clutch 140 comprises the connection bar 133 and the cam hole portion 135 having the engaging recess 135b. Because the clutch 140 is incorporated in the connection mechanism 43E, i.e. the connection mechanism 43E also has a function as the clutch, the clutch 140 can be simplified in construction, with the result that the vehicular steering apparatus 10E can be downsized.

Next, a description will be given about a seven embodiment of the vehicular steering apparatus 10F, with reference to FIG. 13. The seventh embodiment of the vehicular steering apparatus 10F is characterized by provision of a mechanical connection mechanism 40F and clutch 140. The other elements in the seventh embodiment 10F are similar to those in the sixth embodiment shown in FIGS. 11 and 12A-12C and thus will not be described here to avoid unnecessary duplication.

More specifically, the seventh embodiment of the vehicular steering apparatus 10F is characterized in that the clutch 140 has a pair of left and right oblique side surfaces 135cF in place of the oblique side surfaces 135c of the sixth embodiment shown in FIGS. 12A-12C. Each of the oblique side surfaces 135cF is formed in a stepwise (concaveconvex) shape.

Namely, each of the oblique side surfaces 135c in the sixth embodiment shown in FIGS. 12A-12C is a mere flat oblique side surface. Thus, when the steering force has acted on the flat oblique side surfaces 135c while the slider 134 is sliding toward the proximal end of the first rotation, the steering force is divided into a rotational-direction component and an axial component, of which the axial component acts to return the slider 134 in a direction opposite from the sliding direction.

By contrast, with the seventh embodiment, where the oblique side surfaces 135cF are formed in a stepwise (concaveconvex) shape, it can minimize generation of an axial component of the steering force.

Note that the vehicular steering apparatus 10 and 10A to 10F may be controlled in combination with automatic driving control of the vehicle.

The vehicular steering apparatus of the present invention is well suited for use in steering mechanisms of passenger vehicles.

What is claimed is:

1. A vehicular steering apparatus comprising:
a road-wheel turning mechanism mechanically separated from but electrically connected to a steering wheel via an electric connection path which includes a road-wheel turning actuator for generating road-wheel turning power in accordance with steering information based on a steering operation of the steering wheel and which transmits the generated road-wheel turning power to the road-wheel turning mechanism so that road wheels of a vehicle are steered via the road-wheel turning mechanism;
a first rotation shaft connected to the steering wheel;
a second rotation shaft connected to the road-wheel turning mechanism; and
a connection mechanism for interconnecting the first and second rotation shafts in such a manner that the first and second rotation shafts can rotate idle relative to each other within a range of a predetermined relative rotational angle,
wherein:
the connection mechanism has a first part rotatable with the first rotation shaft, and a second part rotatable with the second rotation shaft,
when relative rotation between the first and second rotation shafts exceeds the range of the predetermined relative rotational angle, the first and second parts of the connection mechanism come in contact with each other to thereby cause the first and second rotation shafts to rotate in unison with each other,
the first part of the connection mechanism has a hole formed therein, and the second part of the connection member comprises a connection bar received in and engageable with the hole,
the hole has a substantially triangular shape, and the first and second rotation shafts are relatively movable in an axial direction thereof, and
the hole and the connection bar together form a clutch mechanism.

2. The vehicular steering apparatus of claim 1, wherein the steering information is indicative of at least one of a steering angle, steering angle velocity, steering angle acceleration, a steering torque and differentiated value of the steering torque of the steering wheel.

3. The vehicular steering apparatus of claim 1, which further comprises a reaction motor for generating steering reaction force corresponding to the steering information, and a reaction force transmission mechanism for transmitting the steering reaction force to the steering wheel.

4. The vehicular steering apparatus of claim 1, wherein the clutch mechanism is normally maintained in an OFF state and that, once the clutch is revered to an ON state, compulsorily switches the first and second rotation shafts to an interconnected state irrespective of a connecting state of the connection mechanism.

5. The vehicular steering apparatus of claim 4, wherein, once the electric connection path is deactivated, the clutch mechanism is reversed from the OFF state to the ON state.

\* \* \* \* \*